United States Patent [19]
Schaub et al.

[11] Patent Number: 5,989,314
[45] Date of Patent: Nov. 23, 1999

[54] PRESSURE SWING ADSORPTION AIR PREPURIFIER

[75] Inventors: Herbert Raymond Schaub, East Amherst; Frederick Wells Leavitt, Amherst, both of N.Y.

[73] Assignee: Praxair Technology, Inc., Danbury, Conn.

[21] Appl. No.: 08/991,595

[22] Filed: Dec. 16, 1997

Related U.S. Application Data

[63] Continuation-in-part of application No. 08/533,906, Sep. 26, 1995, abandoned.

[51] Int. Cl.$^6$ .................................................. B01D 53/047
[52] U.S. Cl. ................................... 95/96; 95/119; 95/139; 95/143
[58] Field of Search ........................ 95/96–106, 119–126, 95/139, 143; 96/108, 126–128, 131, 132, 144, 146

[56] References Cited

U.S. PATENT DOCUMENTS

| | | | |
|---|---|---|---|
| 2,790,505 | 4/1957 | Dow | 95/124 |
| 2,995,208 | 8/1961 | Hachmugh et al. | 95/124 |
| 3,866,428 | 2/1975 | Simonet et al. | 95/121 X |
| 3,967,464 | 7/1976 | Cormier et al. | 95/120 X |
| 4,472,178 | 9/1984 | Kumar et al. | 95/99 |
| 4,698,073 | 10/1987 | Rohde et al. | 95/123 |
| 4,783,432 | 11/1988 | Settlemyer | 95/98 X |
| 5,169,413 | 12/1992 | Leavitt | 95/121 X |
| 5,232,474 | 8/1993 | Jain | 55/26 |
| 5,268,022 | 12/1993 | Garrett et al. | 95/98 |
| 5,453,112 | 9/1995 | Sinicrope et al. | 95/103 X |

FOREIGN PATENT DOCUMENTS

| | | | |
|---|---|---|---|
| 152517 | 11/1980 | Japan . | |
| 5-228325 | 9/1993 | Japan | 95/97 |

*Primary Examiner*—Robert Spitzer
*Attorney, Agent, or Firm*—Robert J. Follett

[57] ABSTRACT

A pressure swing adsorption air prepurifier is used to remove water, carbon dioxide and hydrocarbons from a feed gas stream, such as a feed air stream, passing to a cryogenic air separation plant. By the incorporation of a regenerative heat exchange as an integral part of the air prepurifier, the cooling effects of the desorption of water are stored and transferred so as to cool the incoming feed air stream passing to the adsorbent material within the air prepurifier. The productive capacity of the adsorbent material is enhanced thereby.

10 Claims, 1 Drawing Sheet

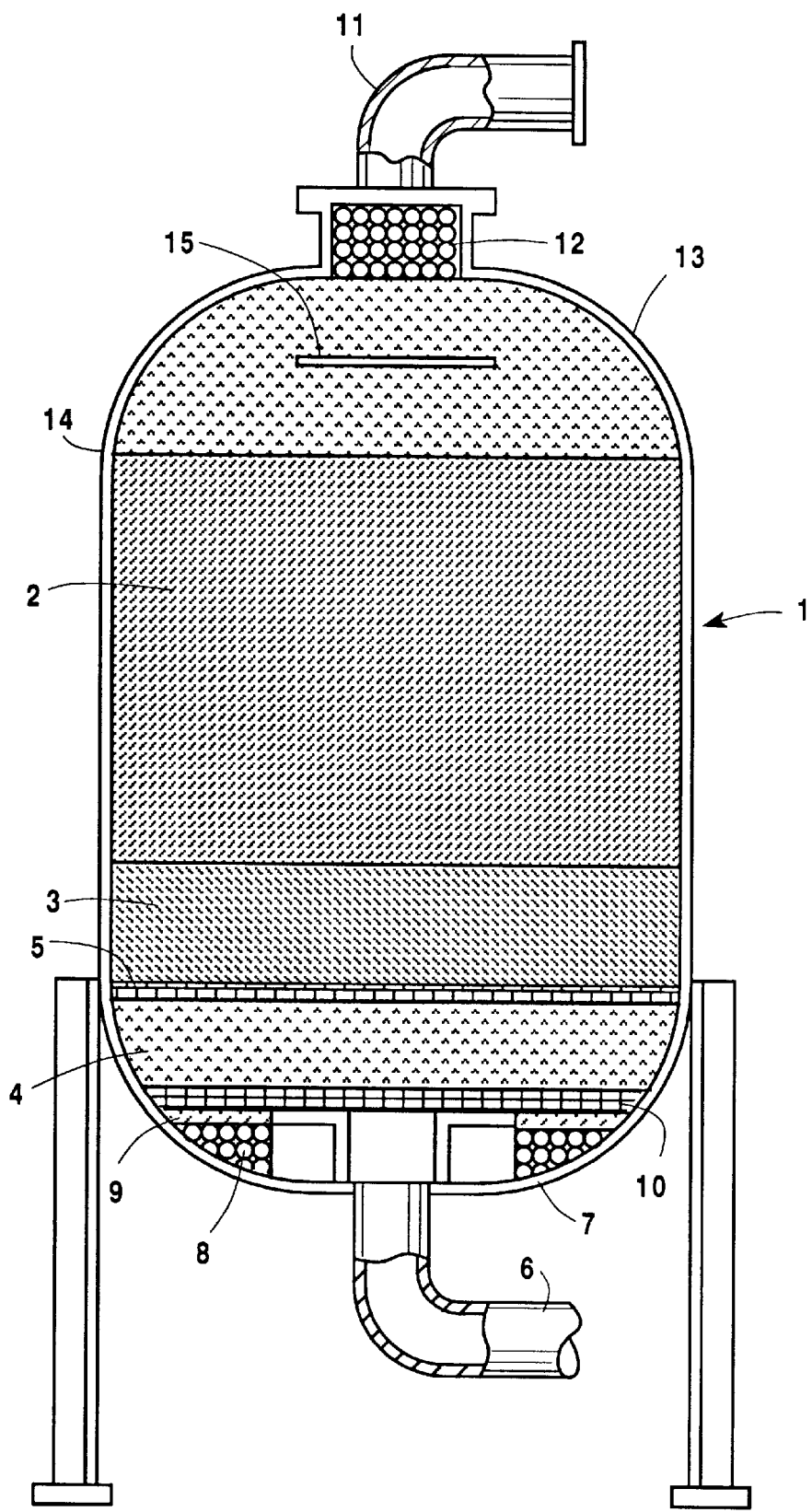

PRESSURE SWING ADSORPTION AIR PREPURIFIER

This is a Continuation of prior U.S. application Ser. No. 08/533,906 filing date: Sep. 26, 1995, now abandoned.

BACKGROUND OF THE INVENTION

1. Field of the Invention

The invention relates to the purification of gas streams. More particularly, it relates to a pressure swing adsorption air prepurifier for the removal of contaminants from feed air prior to cryogenic separation thereof.

2. Description of the Prior Art

The removal of the contaminants present in feed air is a necessary requirement prior to the cryogenic separation of said feed air into its primary constituents, i.e. nitrogen, oxygen, argon and the like. The primary contaminants of air that need to be removed are water, carbon dioxide and hydrocarbons. Since water and carbon dioxide have much higher boiling points than the primary constituents of air, they can condense out and foul the surfaces of heat exchange passages within cryogenic air separation equipment. Hydrocarbons, e.g. acetylene, if not removed from the feed air stream entering the cryogenic air separation plant, can accumulate within said cryogenic plant and can create, in the presence of oxygen, an explosive potential within the cryogenic plant.

The use of adsorbent materials to adsorb water, carbon dioxide and hydrocarbons has been found to be possible when the contaminants are present at high pressure and at moderate temperatures. The pressure swing adsorption (PSA) process can be employed to facilitate the use of such adsorbent materials to selectively adsorb contaminants from a feed air stream at high pressure until the adsorbent materials are very nearly saturated with such contaminants. The contaminants are then desorbed from the adsorbent materials by purging the adsorbent materials with a contaminant-free gas stream at low pressure. This contaminant-free gas stream is typically the waste stream from a cryogenic plant containing primarily oxygen and nitrogen in varying amounts. During the adsorption portion of this adsorption/desorption process, the water present in feed air is typically selectively adsorbed most strongly by the adsorbent materials, with carbon dioxide being the next contaminant in feed air most strongly selectively adsorbed, with the hydrocarbon contaminant of said feed air being selectively adsorbed less strongly than the other contaminants.

The capacity of the adsorbent materials to adsorb contaminants from feed air is adversely affected by relatively high temperature adsorption conditions. In this regard, it is noted that the air temperature entering the PSA air prepurifier can be 10–15° F. higher than ambient temperature due to the heat of compression of the feed air, and the use of moderate temperature cooling water obtained from air cooling tower heat exchangers to cool the compressed feed air. When the water present in the compressed air is adsorbed by the adsorbent material in a PSA system, heat is generated, released and transferred to the feed air stream, raising its temperature and that of the surrounding adsorbent material. Thus, the capacity of the adsorbent material to adsorb carbon dioxide and hydrocarbons, as well as additional quantities of water, is adversely affected by the initial adsorption of water. Conversely, when water is desorbed from the adsorbent material, heat is removed from the low pressure purge gas stream, thereby cooling the purge gas stream and reducing its effectiveness with respect to the desorption of contaminants from the adsorbent material.

PSA air prepurifiers typically employ two or more adsorption vessels so that the flow of decontaminated feed air to the cryogenic air separation plant can remain relatively steady. In order to compensate for such reduced adsorption capacity of adsorbent materials at higher temperatures, an acceptance of the reduced operating capacity of the adsorbent materials is commonly made. This however, results in undesirably increased operating costs due to the need for larger amounts of adsorbent material and an increase in the size of the adsorption vessels therefor. This could also result in higher temperature air entering downstream equipment with possibly detrimental effects. In another approach, external heat exchange devices can be used, with cool purge gas exiting from an adsorption vessel during the desorption portion of the operation in that vessel being used to cool the inlet feed air stream to another adsorption vessel than the one being used to adsorb contaminants from the feed air stream. However, this approach also requires additional capital equipment that necessarily increases the overall cost of the adsorption system.

Other means for removing contaminants from a feed air stream entering a cryogenic air separation plant include the use of thermal swing adsorption (TSA) systems, which use both temperature and pressure as driving forces to cause alternate adsorption and desorption of the contaminants. Reversing heat exchangers can also be used to freeze the water and carbon dioxide contaminants, causing them to plate out on the heat exchanger surfaces. The alternating flow into and out of the heat exchanger in a cryogenic plant allows continuous operation as the flow out of the cryogenic plant will desorb and regasify the feed air contaminants and purge them to the atmosphere.

Such other means will be seen to likewise necessitate relatively high capital and/or operating costs to achieve the desired removal of the above-indicated contaminants from the feed air to a cryogenic air separation plant. There is a desire, in the art, therefore, to develop an air prepurifier capable of more economically removing the contaminants of feed air being passed to a cryogenic air separation plant. There is also a desire to likewise develop economical prepurifiers for use in the purification of other gas streams.

It is an object of the invention to provide a prepurifier capable of economically removing the contaminants from a feed gas stream.

It is another object of the invention to provide an air prepurifier capable of economically removing the contaminants from feed air passing to a cryogenic air separation plant.

With these and other objects in mind, the invention is hereinafter described in detail, the novel features thereof being particularly pointed out in the appended claims.

SUMMARY OF THE INVENTION

An integral regenerative heat exchanger is used in conjunction with a PSA air or other gas stream prepurifier to enable the beneficial cooling effects achieved when water is desorbed from a bed of adsorbent material in a PSA air or other gas prepurifier during the desorption portion of the PSA process to be transferred to the contaminated air or other feed gas stream passing to a prepurifier during the adsorption portion of the PSA process.

BRIEF DESCRIPTION OF THE DRAWINGS

The invention is further described with reference to the accompanying drawing which is a side elevational view of the overall internal configuration of a PSA air prepurifier vessel of the invention.

DETAILED DESCRIPTION OF THE INVENTION

The objects of the invention are accomplished by the use of an integral regenerative heat exchange section within a PSA air prepurifier vessel. This vessel configuration allows the cooling that takes place during the desorption step of the adsorption-desorption PSA processing sequence in the air prepurifier to be stored by high heat capacity material. The thus-cooled, high heat capacity material can then be used to cool the contaminated feed air stream passing through the regenerative heat exchanger section of the PSA air prepurifier vessel on the succeeding adsorption step in said PSA air prepurifier.

An overall reduction of the adsorbent material temperature in the vessel at which the water, carbon dioxide and acetylene contaminants are adsorbed, is accomplished by the invention. Lowering the temperature at which the contaminants are selectively adsorbed from feed air increases the adsorptive capacity of the adsorbent material. Thus, cooling the inlet feed air stream prior to adsorption increases the adsorptive capacity of a given amount of adsorbent material in the PSA air prepurifier. The incorporation of an integral regenerative heat exchanger in the PSA air prepurifier vessel enables this desirable cooling to be accomplished in an economical manner, since the incremental increase in costs associated with the regenerative heat exchange section of the PSA air prepurifier of the invention are modest. Such modest increases in costs include (a) an incremental increase in the cost of the adsorption vessel due to the increased length thereof to accommodate the integral regenerative heat exchange section of the PSA air prepurifier vessel, (b) the modest capital and installation costs associated with the porous regenerative heat exchange material employed in said heat exchange section, (c) the small additional operating costs due to increased pressure drop through the regenerative heat exchange section, and (d) the increased cost of so-called blowdown losses. Such blowdown losses are incurred when the vessel that is used for adsorption of contaminants from feed air at high pressure is depressurized for low pressure desorption of contaminants from the adsorbent material by terminating the flow of contaminated air through the vessel and reducing the air pressure in the vessel from the high adsorption pressure to the low desorption pressure. Purge gas is passed through the bed of adsorbent material in the vessel to facilitate desorption and removal of contaminants from the vessel. The reduction in pressure is accomplished by venting high pressure air from the vessel, typically in a countercurrent pressure reduction step with gas being withdrawn from the feed end of the bed. This reduction in pressure and venting of the vessel reduces the amount of the feed air that is available for cryogenic separation into its primary constituents. The use of a regenerative heat exchange action of the air prepurifier somewhat increases the amount of blowdown losses due to the additional amount of high pressure feed air that is vented from this section of the air prepurifier vessel. Despite such modest increase in costs, the air prepurifier of the invention is found to represent a highly advantageous advance in the art, enabling a significant increase in adsorbent productivity to be achieved in practical commercial operations.

The reduction in the temperature at which the selective adsorption of the contaminants of feed air occurs increases the total amount and the rate of contaminant adsorption achieved in the practice of the invention. Thus, the PSA air purification process is made more efficient as longer adsorption cycle times can be employed in the practice of the invention as a result of the increased adsorbent productivity obtained thereby. Longer cycle times also result in decreased blowdown losses and serve to minimize the disruptive effects of fluctuating feed air flow to the cryogenic plant while one bed is being repressurized from its lower desorption to its upper adsorption pressure. Preferred total cycle times of the invention range from 5 to 40 minutes, preferably about 20 to 25 minutes.

It is generally preferred to position a regenerative heat exchanger section, for purposes of the invention, within a PSA air prepurifier vessel, at the feed end thereof, so as to be immediately before the adsorbent material during the feed air introduction high pressure-adsorption portion of the PSA cycle. During the low pressure-desorption portion of the PSA cycle, the regenerative heat exchanger section will immediately follow the adsorbent material. This is accomplished in the typically vertically oriented adsorption vessel by placing the integral regenerative heat exchange section at the bottom portion of the adsorption vessel, i.e. below the adsorbent material, and by employing a vertically upward flow of contaminated feed air during the high pressure adsorption step and a vertically downward flow of non-contaminated purge gas during the low pressure purge or adsorbent bed regeneration step.

While the invention is further described below particularly with respect to the PSA air prepurifier embodiment, it will be appreciated that it can be used in a variety of other embodiments in which an adsorption process is adversely affected by increase in operating temperatures. Such circumstances pertain where a contaminant to be removed from a feed gas stream has a high heat of adsorption and is present in sufficient quantity to cause significant temperature increases during the adsorption process. A hydrogen PSA process is an example of another embodiment of the invention. In this latter embodiment, significant amounts of water, carbon dioxide and hydrocarbons are present as contaminants to be selectively removed from a hydrogen feed gas stream.

As shown in FIG. 1 of the drawings, an adsorption vessel is designated by the numeral 1, with adsorbent material used to selectively adsorb contaminants from feed air being positioned therein as adsorbent bed 2. In the illustrated embodiment, a portion of the adsorbent material is used to selectively adsorb water present in the contaminated feed air, i.e., in water adsorption zone 3 positioned beneath said adsorbent bed 2. Regenerative heat exchange zone 4 is positioned directly below the water adsorption zone portion of the adsorbent material, with a thin layer 5 of support balls desirably positioned therebetween to support adsorbent bed 2 and water adsorption zone 3 within adsorption vessel 1.

Conduit 6 is connected to head space 7 at the bottom of said adsorption vessel 1 for the introduction of contaminated feed air to be treated therein in the air feed introduction adsorption portion of the PSA cycle, and for the discharge of purge gas and contaminants selectively removed from the feed air during the desorption-regeneration portion of the PSA cycle. Head space 7 at the bottom of adsorption vessel 1 is typically filled with ceramic balls or other such material to reduce the amount of void space therein. In the illustrated embodiment, a section 8 of larger, e.g. 2" balls, is positioned at the bottom of the vessel, with a layer 9 of intermediate size balls, e.g. 1" balls, positioned thereon, and with a top layer 10 of smaller sized balls, e.g. ½" balls, positioned on said intermediate layer 9 immediately below regenerative heat exchange zone 4. This is desirably done for purposes of providing relatively uniform flow through the adsorbent bed. Similarly, conduit 11 is connected, in the illustrated embodiment, to a section 12 of adsorption vessel at the uppermost portion thereof, in which large size balls, e.g. 1" or 2" balls, are positioned. Head space 13 is in fluid communication with said section 12 and is filled with smaller sized balls, e.g. ½" balls, that rest on a ball/adsorbent material separation screen 14 immediately above adsorbent bed 2. Conduit 11 provides for the removal of purified feed air from adsorption vessel 1 during the feed air introduction-adsorption portion of the PSA cycle and for the introduction of purge gas to the adsorption vessel during the desorption-regeneration portion of said PSA cycle. In the illustrated embodiment, a baffle 15 is positioned in head space 13 so as to desirably avoid gas channeling therein and to assure that a relatively uniform flow of gas is achieved across adsorbent bed 2 during both adsorption and desorption operations in adsorption vessel 1.

The placement of the regenerative heat exchange zone directly beneath the adsorption zone (including the water adsorption zone) is advantageous since the majority of the heating and cooling of the adsorption-desorption process takes place in close proximity to the regenerative heat exchange zone. In this regard, water is the contaminant that is adsorbed most strongly by the adsorbent, and the majority of the water present in the feed air is adsorbed in the lower water adsorption zone 3 of the vessel. Thus, when such adsorbed water is desorbed during the next desorption-regeneration portion of the PSA cycle in said vessel, the cooling effect can be readily transferred to the high heat capacity porous material that forms integral regenerative heat exchange zone 4. It should also be noted that when the flow direction in the PSA vessel is again reversed, and hot, contaminated feed air is again introduced into the adsorbent bed in the vessel, the refrigeration stored in the high heat capacity porous material can be readily transferred to the incoming air before the contaminants in the air began to be adsorbed by the adsorbent material. The cooling of the incoming air is beneficial to the operation of the PSA air prepurifier in that the operating temperature of the total adsorbent bed is reduced. This increases the adsorption performance of the adsorbent material. The cooling of the incoming feed air stream, which typically is fully saturated with water (100% relative humidity) at the pressure and temperature at which it enters the PSA air prepurifier, can also cause some of the water in the incoming feed air stream to condense on the material that forms the regenerative heat exchange zone. Condensation of water prior to the adsorbent bed will also reduce the operating temperature of the adsorbent material, as less heat will be generated by the adsorption of water due to a reduction in the amount of water that must be adsorbed. Condensation of some of the incoming water will reduce the total water load that must be adsorbed by the adsorbent material only if the condensed water is not introduced into the adsorbent bed. The undesired introduction of condensed water into the adsorbent bed is minimized by the location of the regenerative heat exchange zone directly beneath the adsorbent bed. By this feature, condensed water can drain away from the adsorbent bed due to gravity and can only be carried into the adsorbent bed by entrainment in the contaminated feed air stream. It has been found, however, that water droplets typically greater than 0.0077" in diameter will not be entrained by the contaminated feed air stream due to the relatively low velocity of the typical feed air stream as it passes through the porous material that forms the regenerative heat exchange zone.

The capacity of the regenerative heat exchange zone is found to be a function of the physical and thermal properties of the porous material that forms the regenerative heat exchange zone. The sizing of the regenerative heat exchange zone depends on the thermophysical properties of the gas that is heated or cooled and the mass velocity of the gas through the regenerative heat exchange zone, as well as the cycle time at which the PSA air prepurifier adsorbed beds are operated. For the case of the subject regenerative heat exchange zone of a PSA air prepurifier, a regenerative heat exchange zone sized at about 20–30% of the volume of the adsorption zone will generally provide adequate heat storage capacity to store the refrigeration produced when water is desorbed for cycle times of 10–15 minutes. It is within the scope of the invention to size the integral regenerative heat exchange zone of the invention from about 10% to about 50% or more of the volume of the adsorption zone(s) in practical, economical embodiments of the invention, as the size of the regenerative bed exchange zone is dependent on the adsorption and desorption cycle times employed in practical commercial embodiments of the invention. Longer cycle times necessarily require larger regenerative heat exchange zones to store the refrigeration produced when water is desorbed from the adsorbent material. Refrigeration is then transferred to the incoming contaminated feed air stream when the flow direction through the PSA air prepurifier is reversed, and thus lowers the feed air temperature entering the adsorbent material. This cooling of the feed air stream reduces the temperature at which the adsorbent material is required to operate, thus increasing the capacity of the adsorbent material to adsorb water, carbon dioxide and acetylene. The lowering of the temperature of the inlet feed air also reduces the amount of water that is available for adsorption by the adsorbent material. This reduction of the amount of water that must be adsorbed by the adsorbent material also tends to lower the operating temperature of the PSA air prepurifier as the amount of heat generated when water is adsorbed is reduced.

In an illustrative pilot plant operation using the PSA air prepurifier of the invention, two 8' high beds were employed in a vessel constructed from 3" SCH 10S pipe. Thermocouples were positioned at spaced intervals along the vertically positioned vessel, and ambient air, and inlet, product, purge inlet and purge outlet temperatures were measured during a 15 minute adsorption and a 15 minute desorption sequence in the PSA processing cycle. Repressurization of the adsorbent bed lasted about 60–70 seconds. It was observed that the temperature 12" high from the lower end of the adsorbent bed began to increase from 88° F. to 95° F. immediately after the beginning of the adsorption step, but then decreased until a minimum temperature of about 83° F. was reached approximately 6 minutes into the adsorption cycle. This bed temperature then increased to a maximum of about 117° F. at the end of the adsorption cycle. The decrease in temperature of the adsorbent bed part way into the adsorption step indicates that refrigeration was being transferred to the incoming contaminated air stream by the regenerative heat exchange zone directly upstream of i.e. below, the adsorbent bed. As expected in light of the cyclic nature of the PSA process, temperatures in the regenerative heat exchange zone varied from a maximum of about 98° F. to a minimum of about 68° F.

The regenerative heat exchange zone can employ any suitable, commercially available high heat capacity, inert, porous material, e.g. such as that available commercially from Norton Co. The desirable characteristics of such material used in the regenerative heat exchange zone are: high heat capacity, high density, high thermal conductivity, high surface coefficient of heat transfer, low resistance to flow through the regenerator, high crushing strength, non-contaminating (either particulate or gaseous) and low cost. While ceramic balls are conveniently and generally preferred for use in the regenerative heat exchange zone, a variety of other materials are available and suitable for such use, e.g. tubular, non-activated alumina; high density naturally occurring rocks or pebbles; or metallic shapes, i.e. either granular in nature or sintered to form a porous material. The regenerative heat exchange zone will generally operate at temperatures within the range of from about 50° F. to about 130° F., and temperature extremes (from ambient temperature) are readily accommodated in the practice of the invention.

As indicated above, the regenerative heat exchange zone should preferably be positioned upstream of the adsorbent material, i.e. directly beneath the adsorption zone, when the PSA air prepurifier is undergoing the high pressure, adsorption step and downstream of the adsorbent material when the PSA air prepurifier is undergoing the low pressure desorption step. It is noted that for the purposes of the invention the ratio of waste flow rate to feed flow rate is greater than about 0.3 and less than 0.7, preferably greater than about 0.3 and less than 0.5.

The positioning of the regenerative heat exchange zone directly beneath the adsorption zone of a vertically oriented PSA air prepurifier vessel has the added benefit of enabling the ceramic balls therein to support the adsorbent material in a convenient manner without undesired migration of the adsorbent material downward through the porous matrix of ceramic balls. For this purpose, the quasi-spherical ceramic balls of the regenerative heat exchange zone should desirably be up to about twice the diameter of the generally quasi-spherically balls of adsorbent material used in the adsorption zone, including the lower water adsorption zone portion thereof. An alternative means for precluding undesired migration of smaller diameter adsorbent material through larger diameter regenerative heat exchanger zone material is to employ separation screens having smaller mesh size openings than the diameters of the materials being separated, e.g. the adsorbent material.

While any suitable, commercially available adsorbent material can conveniently be used in the PSA air prepurifier of the invention, activated alumina is convenient and generally desirable. Such activated alumina is commercially available from suppliers such as LaRoche Chemicals. As the generally known adsorbent materials tend to exhibit an exothermic reaction upon adsorbing water, and an endothermic reaction when desorbing water, other types and sizes of activated alumina can be used in the adsorbent bed section of the PSA air prepurifier of the invention and benefit from the integral regenerative heat exchange capability provided in the PSA air prepurifier as herein described and claimed. Such adsorbents, when used in PSA prepurification according to the invention should have a minimum water loading of greater than 3% (weight water/weight adsorbent),and an average water loading that is preferably greater than 10% (weight water/weight adsorbent). For such adsorbents in this PSA prepurification, the average water loading may be greater than 20% (weight water/weight adsorbent). Such adsorbents should also have a minimal loading that is preferably less than 1% (weight adsorbate/weight adsorbent) for each of nitrogen or oxygen.

In a representative pilot plant embodiment of the invention as illustrated in the drawing, the adsorption zone comprises a lower alumina-containing adsorbent water adsorption zone 3 having a depth of about 12", with an upper alumina-containing adsorption zone 2, for the adsorption principally of carbon dioxide, acetylene and other hydrocarbons, having a depth of about 48". Ball/alumina separation screen 14 positioned on top of adsorption zone 2 supports ceramic balls filling upper head space 13. Upper discharge space 12 is filled with larger sized balls. Baffle 15 is centrally positioned in head space 13 of the illustrative PSA air prepurifier configuration.

The adsorbent particles in water adsorption zone 5 are supported, in the illustrative example, by a thin layer of ⅛" balls. The integral regenerative heat exchange zone 4 comprises ¼" high heat capacity balls having a depth of about 18", supported by ½" balls in zone 10; by 1" balls in zone 9; and 2" balls in zone 8 of lower head space 7 of vessel 1.

The invention, through the use of the integral regenerative heat exchange zone disclosed above, conveniently stores the cooling effects of the desorption of contaminants from the adsorbent material in a PSA air prepurifier and transfers this stored refrigeration to feed air passing through said PSA air prepurifier to a cryogenic air separation plant. The adverse effects of higher PSA operating temperatures are thereby mitigated, and the productive capacity of the adsorbent material employed in the PSA air prepurifier is significantly improved. As a result, a practical operating problem in the use of PSA air purifiers for cryogenic air separation plants is conveniently overcome, and the use of PSA air purifiers for such purpose in practical commercial applications is appreciably enhanced.

We claim:

1. A pressure swing adsorption air purification process comprising:

a) passing a feed air stream containing water and other contaminants through a system having an adsorption vessel containing a bed of adsorbent material having a loading for nitrogen of less than 1% (weight nitrogen/weight adsorbent),that selectively adsorbs said water and other contaminants present in said feed air stream at a high adsorption pressure and desorbs said water and other contaminants at a low desorption pressure, the adsorption vessel having a feed end for the introduction of said feed air stream thereto and a product end for the recovery of purified air therefrom, and further comprising an integral, regenerative heat exchange zone positioned within the adsorption vessel between the feed end of the adsorption vessel and the bed of adsorbent material, said integral, regenerative heat exchange zone comprising high heat capacity material capable of storing cooling from a contaminant-containing desorption stream passing from the feed end of the adsorption vessel during the desorption of contaminants from the bed of adsorbent material, and of transferring the resulting refrigeration to the feed air stream passing to the bed of adsorbent material for the selective adsorption of said water and other contaminants therefrom, whereby the temperature of said feed air stream containing water and other contaminants, and of said bed of adsorbent material is lowered; b) passing said purified air to a cryogenic air separation plant for separation and recovery of oxygen, nitrogen and argon, wherein step "a" has a duration of about 5 to about 40 minutes.

2. The process of claim 1 wherein the adsorption vessel is a vertically oriented vessel, with said integral, regenerative heat exchange zone being positioned in the adsorption vessel below the bed of adsorbent material.

3. The process of claim 2 in which said integral, regenerative heat exchange zone is positioned directly below the bed of adsorbent material.

4. The process of claim 2 in which the adsorbent bed comprises a water adsorption zone for the selective adsorption of a major portion of water present in the feed gas stream, said zone being positioned in the lower portion of said bed of adsorbent material, and an adsorption zone for the removal of residual water and other contaminants positioned in the upper portion of said bed of adsorbent material.

5. The process of claim 4 in which said integral, regenerative heat exchange zone is positioned directly below the bed of adsorbent material.

6. The process of claim 1 in which the bed of adsorbent material comprises a water adsorption zone for the selective adsorption of a major portion of water present to the feed,gas stream positioned nearer the feed end of the adsorption vessel and an adsorption zone for the removal of residual water and other contaminants positioned nearer the product end of the adsorption vessel.

7. The process of claim 1 in which the high heat capacity material in the integral, regenerative heat exchange zone comprises ceramic balls.

8. The process of claim 7 in which the adsorbent material comprises alumina.

9. The process of claim 1 and including conduit means at the feed end of the adsorption vessel for passing said feed gas stream to the adsorption vessel and for discharging desorbed contaminants and purge gas from the adsorption vessel, and conduit means at the product end of the adsorption vessel for removing purified air from the adsorption vessel and for introducing purge gas thereto to facilitate the desorption of contaminants from the bed of adsorbent material.

10. The process of claim 1, wherein step "a" has a duration of about 20 to about 25 minutes.

* * * * *